Jan. 11, 1955  A. L. HUBBARD  2,699,029
COTTON PICKER DOFFER
Filed June 11, 1953  2 Sheets-Sheet 1
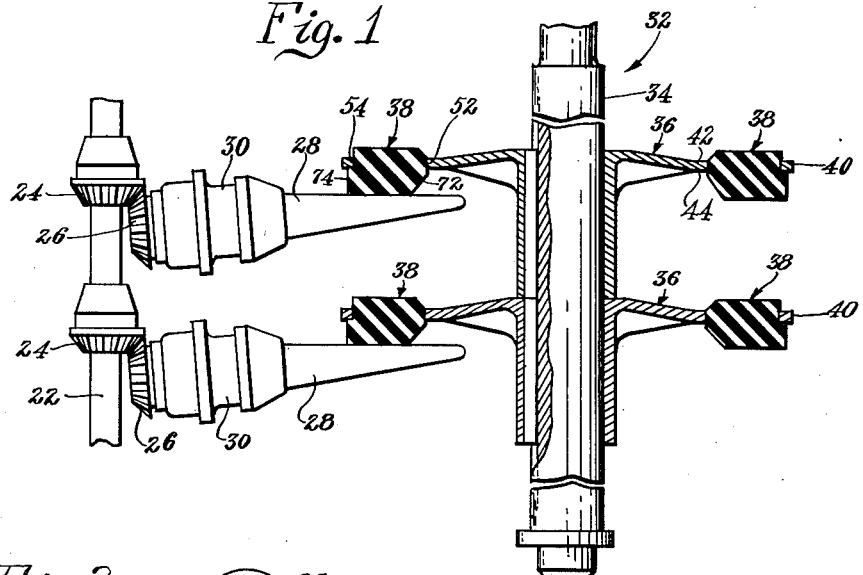
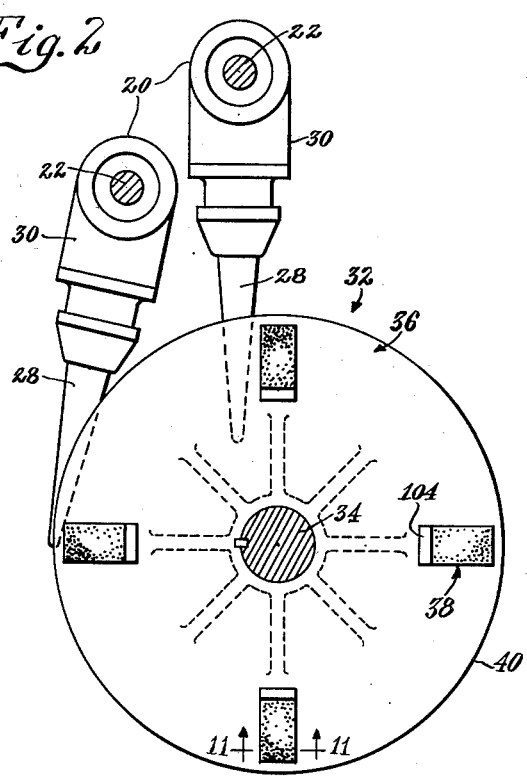
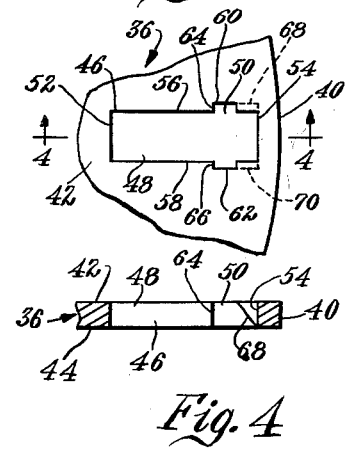
INVENTOR.
A. L. Hubbard
BY
Attorneys

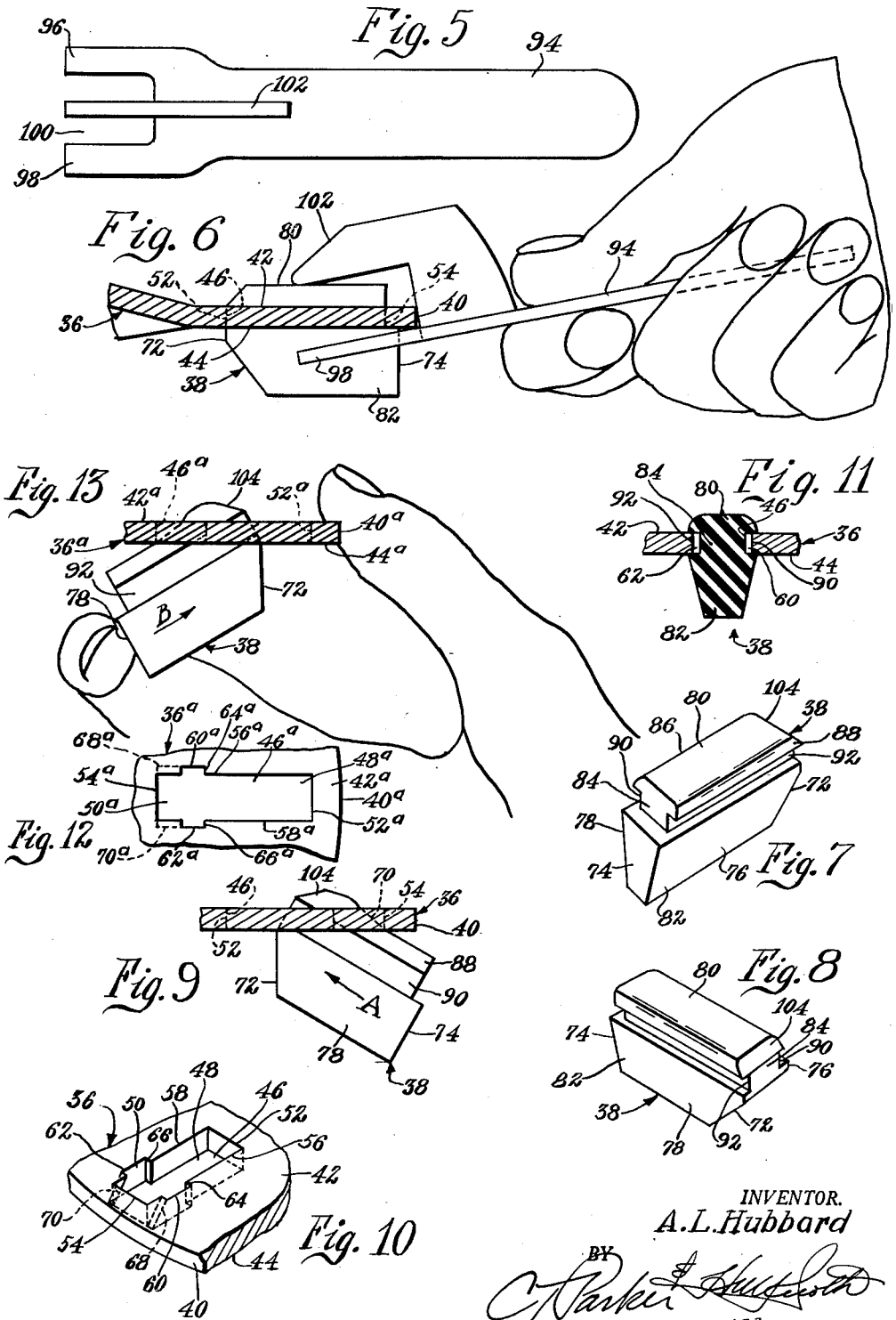

United States Patent Office 2,699,029
Patented Jan. 11, 1955

2,699,029

COTTON PICKER DOFFER

Arthur L. Hubbard, Madrid, Iowa, assignor to Deere Manufacturing Co., Dubuque, Iowa, a corporation of Iowa Application June 11, 1953, Serial No. 360,936

10 Claims. (Cl. 56—41)

This invention relates to doffing means for a cotton picker and more particularly to improvements in the doffing means per se in which the principal objects of the invention are to provide a doffer that is relatively inexpensive, one that may be readily kept in condition by replacing various parts thereof from time to time, and one that may be utilized in machines of existing designs.

The conventional cotton picker of the spindle type comprises one or more cotton-picking drums mounted on upright axes and having a plurality of columns arranged about those axes, from each of which columns projects a series of vertically spaced spindles (barbed or otherwise). The drums are arranged in a mobile frame so that as the machine advances, plants in a cotton row are received between a pair of cooperating drums so that the spindles or fingers project into the plants and pick the cotton therefrom. The drums, as well as the spindles, rotate as the machine advances and the moving spindles are caused to pass through doffing means. Broadly, the doffing means comprises an upright shaft on which is a plurality of disks or equivalent means spaced apart vertically on the order of the spacing of the series or layers of spindles. The purpose of each doffer in each doffing means is to engage the cotton on the associated spindles and to remove that cotton by a wiping or brushing action.

The fundamental principles just outlined have been known for many years and the present development of the industry concerned with cotton-picking machines is improvement in various important details expected to minimize the complexity of the machine and to cut down as much as possible the cost of maintenance. It has been found that the individual doffers in the conventional cotton picker wear to a considerable extent and must be replaced from time to time. If the doffers are designed in such manner that they are assembled on a shaft to form an integral structure, replacement of one or more doffers requires disassembly of the entire shaft, before which the shaft itself must be removed from the machine. Various efforts have heretofore been made to provide individual doffing elements that will eliminate the difficulty just referred to, but in the main these have not proved entirely successful. According to the present invention, these difficulties, previously experienced, are eliminated by the provision of a simple and inexpensive doffer comprising a carrier in the form of a disk having therein a plurality of peculiarly shaped slots or openings and a plurality of doffing blocks, equal in number to the openings, individually receivable in and forcibly removable from the openings. Each doffing member or block is preferably composed of rubber or rubber-like material or other material capable of deformation and further capable of returning to shape after deformation so that the block may be removed from the disk without destruction of the block or damage to the carrier. It is an important object of the invention to provide a block of a character that may be readily removed and replaced by identical blocks, so that as the blocks wear they may be easily removed and replaced in order that the operating efficiency of the doffing mechanism may be maintained at its peak. It is a further object of the invention to provide an improved tool for removing the blocks from their openings in the disk or carrier.

The foregoing and other important objects and desirable features inherent in and encompassed by the invention will become apparent as preferred embodiments of the invention are described in detail in the following description and illustrated in the accompanying sheets of drawings, in which Fig. 1 is a fragmentary elevational view with parts broken away and shown in section showing a portion of the doffing mechanism associated with a portion of the picking mechanism.

Fig. 2 is a plan view of the device shown in Figure 1 with the stub shaft broken away and shown in section.

Fig. 3 is a fragmentary plan view of a peripheral portion of the disk or carrier, on a somewhat enlarged scale, illustrating one form of block-receiving slot.

Fig. 4 is a section along the line 4—4 of Fig. 3.

Fig. 5 is a plan view of a tool for facilitating removal of the blocks.

Fig. 6 shows the tool in side elevation and in use in the removal of a block, the block and support structure being enlarged.

Fig. 7 is a perspective view of one of the blocks as seen from one end.

Fig. 8 is a perspective view of one of the blocks as seen from the other end.

Fig. 9 is a fragmentary elevational view with parts broken away and shown in section showing the manner of inserting a block.

Fig. 10 is a perspective view of the structure shown in Fig. 4.

Fig. 11 is a transverse section on the line 11—11 of Fig. 2.

Fig. 12 is a fragmentary plan view of a portion of a carrier modified by a reversed slot.

Fig. 13 illustrates the insertion of a block in the slot shown in Fig. 12.

Familiarity with cotton picker designs of the type referred to above will be assumed and therefore only so much of the picking and doffing mechanism is illustrated as is deemed sufficient to orient the invention. As already indicated, a conventional cotton picker of this type will include a plurality of columns, such as those designated by the numeral 20 here, arranged about an axis to form a drum assembly. Each column journals and encloses a coaxial shaft 22 and keyed to this shaft are several bevel pinions 24. These pinions are in constant mesh with bevel pinions 26 keyed to the inner ends of laterally outwardly projecting picker spindles 28, a suitable bearing 30 being provided for each spindle and the bearings being carried in the columns 20.

The doffing mechanism or means is indicated in its entirety by the numeral 32 and is shown as comprising an upright rotatable shaft 34 on which are keyed a plurality of vertically spaced carriers or disks 36, each disk being thus rotatable about the upright axis of the shaft 34 and the disks, being keyed to the shaft, being rotatable in unison. The vertical spacing of the disks is such that they are respectively interleaved as respects the layers of spindles 28. Each disk or carrier has mounted therein a plurality of doffing members or blocks 38, the purpose of the blocks being to wipe or doff cotton from the spindles 28 as the spindles pass through the doffing means 32 as indicated generally in Fig. 2.

The carrier is, but need not necessarily be, a disk, having thereby a peripheral outer edge 40. Since the disk is substantially plate-like in form, each portion of the disk, except, of course, at its central or hub portion, will be a plate-like element and will have upper and lower radial faces 42 and 44. It should be noted that here, as well as in the claims, directional expressions, such as "upper," "lower," "vertical," etc. are used as words of convenience rather than as words of limitation, since it is quite obvious that the axis of the doffer means 32 might be horizontal or the doffing members may be arranged to extend upwardly from the carriers 36 rather than to depend therefrom, for example.

Each carrier or disk 36 has therein an opening or slot 46 and one doffing block 38 is carried in each slot. Thus, the members or blocks 38 are individually mounted for removal and replacement. Since all of the blocks are identical and since the slots are identical, only one of each will be described in detail.

Each slot or opening 46 is of generally keyhole form or in the shape of a cross or T, having a relatively narrow portion 48 formed by the leg of the T and a relatively wide portion 50 formed by the bar of the T. The slot 46 extends vertically through the element 36 and has a continuous boundary formed by contiguous portions of the element 36 so that entry thereto and exit therefrom may be had only in generally vertical directions. The continuous boundary of the slot includes closed opposite ends 52 and 54 and spaced-apart opposite sides 56 and 58. The sides 56 bound the narrow portion 48 and extend from the end 52 toward the opposite end 54 of the slot but, since the slot has the wider portion 50, formed by the bar of the T, this wider portion itself has opposite side portions 60 and 62 which extend toward and respectively adjoin the narrow portion sides 56 and 58 at offset junctions 64 and 66. In the case of the structure of Figs. 1 through 10, the end 54 of the slot 46 is its outer end, lying proximate to the peripheral edge 40 of the element 36. This end of the slot includes at opposite sides thereof guide portions 68 and 70 that slope downwardly and in the direction away from the narrow portion 48 of the slot, for purposes to presently appear.

In the modified form of disk 26a shown in Figs. 12 and 13, an identical slot, designated 46a is reversely positioned in the disk so that its end 54a is relatively remote from the peripheral edge 40a. In all other respects, the slot 46a is identical to the slot 46, having portions 48a, 50a, 52a, 54a, 56a, 58a, 60a, 62a, 64a, 66a, 68a and 70a, corresponding respectively to the portions 48, 50, 52, 54, 56, 58, 60, 62, 64, 66, 68 and 70 of the slot 46.

The block 38, or doffing member, has opposite ends 72 and 74, opposite sides 76 and 78, upper and lower parts 80 and 82 and a reduced intermediate or neck part 84. When the block is in place in the slot 46, the ends 72 and 74 are respectively proximate to the slot ends 52 and 54 (Figs. 1 and 6), and the upper and lower portions 80 and 82 are respectively above and below the upper and lower disk faces 42 and 44 (Fig. 11). The intermediate or neck portion 84 of the member 38 substantially fills the slot 46, except that the transverse dimension or width of the neck, being on the order of the width of the narrow portion 48 of the slot, does not extend into the offset portions 64 and 66 (also Fig. 11).

The length of the neck part 84 is such that it runs from end to end of the slot 46, and the upper part 80 has a width greater than the width of the narrow portion 48 of the slot, being preferably on the order of the width of the wide portion 50 of the slot so that the upper part 80 is provided in effect with opposite, laterally extending wings 86 and 88 that overhang or overlap and abut the upper face of the carrier element along opposite sides of the slot 46. The lower part 82, at least in the upper portion thereof that adjoins the neck part 84, has a width greater than that of the narrow portion of the slot so as to abut the lower face of the carrier element along opposite sides of the slot. Thus, the block is normally held against vertical displacement relative to the carrier element 36.

The doffing member or block 38 may also be described as being of plug-like form, wherein the relatively narrow dimensional characteristics of the neck portion 84 with respect to the wider upper and lower portions 80 and 82 produce in the block opposite grooves 90 and 92 that run lengthwise of the block. Another characteristic of the block is that the vertical dimension of the neck part 84, or the height of the grooves 90 and 92, is on the order of the thickness of the carrier element 36, which may also be defined as a vertical dimension between the upper and lower carrier element faces 42 and 44.

Still further, the vertical dimension or thickness of each of the wings 86 and 88 that make up the overhanging portions of the upper part 80 is on the order of the width of the wide portion 50 or bar of the T of the slot 46, these portions 86 and 88 being relatively thin as compared to the rest of the block. In the preferred embodiments of the invention illustrated, the entire block 38 is composed of rubber or rubber-like material or equivalent material that is capable of deformation and returning to shape so that the block may be manipulated relative to the slot in a manner to be presently described.

As previously outlined, the only difference between the disk 36a and the disk 36 is that the slot 46a in the former is reversed relative to the slot 46 in the latter. Since the same blocks 38 may be utilized in either slot 46 or 46a, reference numerals used on the block 38 in Figs. 12 and 13 are the same as those used on the block illustrated in Figs. 1 through 11.

Figs. 5 and 6 illustrate a tool useful in ejecting or removing the block. This tool comprises basically a handle 94 bifurcated at one end to provide a pair of legs 96 and 98 spaced apart at 100 a distance slightly greater than the transverse thickness of the block 38. Welded to the upper surface of the handle 64 is a hook or bill 102 that extends centrally over the space or opening 100 between the furcations or legs 96 and 98. As illustrated in Fig. 6, the tool is used by hooking the legs 96 and 98 beneath the underface 44 of the disk 38, with the bill or hook 102 engaging the upper part 80 of the block 36. Since the transverse dimension or thickness of the hook or bill 102 is materially less than that of the block 38, the pressure in the main will be applied substantially in the median plane of the block. Since the block, or at least its upper portions, is composed of material of the nature aforesaid, the outer edge or wing portions 86 and 88 of the upper part 80 are capable of yielding transversely inwardly to what may be termed a narrowing pressure as the tool 94 forces the block in a downward direction. Stated otherwise, the upper part 80 of the block is capable of being restricted to a narrower dimension substantially on the order of that of the narrow portion 48 of the slot 46, whereby the block may be displaced or ejected downwardly relative to the carrier. The material of which the block is composed is also such that the block is capable of returning or expanding from the narrowing deformation so that removal thereof from the carrier occurs without destruction of the block and without damage to the carrier. Since the upper wing portions 86 and 88 are relatively thin, deformation of the character just referred to is readily accomplished. Normally, however, these portions, together with the upper laterally projecting portions of the wider part of the lower part are sufficient to maintain the block in the carrier against vertical displacement. Since the opening or slot 46 is closed or has a continuous boundary, the block cannot escape in any radial or circumferential direction.

The same or an identical replacement block 38 may be inserted in the carrier 36 as suggested in Fig. 9. Because of the wider portion 50 of the keyhole or T-shaped slot 46, and because of the dimensional conformity of the wider portion of the slot with the shape and size of the end 72 of the block, the end of the block may be initially inserted from below the carrier 36 at an upward and inward angle. Thereafter, pressure is applied in the direction of the arrow A (Fig. 9) and, because of the deformable and returnable character of the material of which the block is composed, the block may be readily forced endwise along the narrow portion of the slot until the upper wing portions 86 and 88 of the upper part 80 snap over the slot-bounding portions of the upper carrier face 44. The leading or forward edge of the upper part 80 of the block may be beveled, as at 104, to facilitate initial entry of the block into the wide portion of the slot 46. This bevel, in addition to the sloping guide portions 68 and 70 (previously described) make initial insertion a relatively easy matter. The carrier 36 is preferably composed of metal and although there may be some friction between this metal and the rubber or rubber-like material of the block, the friction is easily overcome by manual pressure. The purpose of the tool is to accomplish forcible ejection or removal, since the block is somewhat more difficult to remove than it is to install, which is not a disadvantage, because the tenacity of the block in remaining in place is desirable so that it will not become dislodged during operation. On the other hand, it is desirable that replacement blocks be readily insertable without special tools.

In Figs. 12 and 13, installation of the block 38 is accomplished by initially inserting the block at an upward and outward angle, because the wide portion 54 of the slot is relatively remote from the peripheral edge 40a of the carrier. This enables the operator to apply a squeezing force between his thumb and forefinger as against the peripheral edge 40a and the rear end 74 of the block 38. In all other respects, installation of the block 38 in the disk 36a is the same as described in connection with installation of the block 38 in the disk 36. The same tool 94 may be used to remove the block 38 from the disk 36a. The arrow B in Figure 13 indicates the direction in which the block 38 is forced for completing its insertion in the slot 46a.

Specific features, advantages and characteristics of the invention not specifically enumerated herein will undoubtedly occur to those versed in the art, as will many modifications in the preferred embodiments shown, all of which may be achieved without departing from the spirit and scope of the invention.

What is claimed is:

1. A cotton picker doffer, comprising: a carrier rotatable about an upright axis and including a radial plate-like element having upper and lower faces and provided with a slot of generally keyhole form opening through said faces; said slot including closed opposite ends and having at one end a relatively narrow portion defined by relatively closely spaced apart opposite sides extending toward the other end of the slot and a relatively wide portion at said other end defined by relatively widely spaced apart opposite sides extending toward and respectively joining the sides of the narrow portion; a doffing member mounted in the carrier element via the slot and having opposite ends respectively at the opposite ends of said slot, said member including upper and lower parts respectively above and below the upper and lower faces of the carrier element and a neck part joining said upper and lower parts and received within the slot; said neck part running substantially from end to end in the slot and having a width on the order of the width of the narrow portion of the slot; said upper part having a width on the order of that of the wide portion of the slot so as to overhang and abut the upper face of the carrier element along opposite sides of the narrow portion of the slot; said lower part, at least in the upper portion thereof that adjoins the neck part, having a width greater than that of the narrow portion of the slot so as to abut the lower face of the carrier element along opposite sides of said narrow portion of the slot; and said member, at least in its upper part being composed of material capable of yielding to a width on the order of that of the narrow portion of the slot and returning to shape so as to enable the member to be displaced from the slot by downward force applied thereto, and the wide portion of the slot providing an entry way for installation of a similar doffing member from below the carrier element by insertion of such member endwise into said wide portion at an angle to the carrier element and with one end of the neck part of such member entering the slot at the junction of the wide and narrow portions of the slot and with one end of the upper part of such member received in said wide portion of the slot so that such member may be forced endwise along the slot toward said narrow portion until the upper part of such member snaps over the upper radial face of the carrier element.

2. The invention defined in claim 1, in which: the carrier element has an outer edge portion and the slot is positioned with its narrow portion adjacent to and its wide portion relatively remote from said edge portion so that, when one end of the doffing member is intially inserted into the wide portion from below and at an angle to the carrier element, the other end of such doffing member will be relatively remote from said edge and such member may be forced into the slot by squeezing pressure applied between said other end and said edge.

3. The invention defined in claim 1, in which: the vertical dimension of the neck part of the doffing member is on the order of the thickness of the carrier element between its upper and lower radial faces, and the length of the wide portion of the slot is on the order of said vertical dimension of the neck part.

4. The invention defined in claim 1, in which: the end of the slot at the wide portion thereof is defined by guide portions sloping downwardly and in the direction away from the narrow portion to facilitate entry of the doffing member at the aforesaid angle.

5. A cotton picker doffer, comprising: a carrier rotatable about an upright axis and including a radial plate-like element having upper and lower faces and provided with a slot opening through said faces, said slot having closed opposite ends and bounded by spaced apart opposite sides; a doffing member mounted in the carrier element via the slot and having opposite ends respectively at the opposite ends of said slot, said member including upper and lower parts respectively above and below the upper and lower faces of the carrier element and a neck part joining said upper and lower parts and received within the slot; said neck part running substantially from end to end in the slot and having a width on the order of the width of the slot; said upper part having a width greater than that of the slot so as to overhang and abut the upper face of the carrier element along opposite sides of the slot; said lower part at least in the upper portion thereof that adjoins the neck part, having a width greater than that of the slot so as to abut the lower face of the carrier element along opposite sides of the slot; and said member, at least in its upper part being composed of material capable of yielding to a width on the order of that of the slot and returning to shape so as to enable the member to be displaced from the slot by downward force applied thereto.

6. A cotton picker doffer, comprising: a carrier rotatable about an upright axis and including a radial plate-like element having upper and lower faces and provided with a slot opening through said faces, said slot having closed opposite ends and bounded by spaced apart opposite sides; a doffing member mounted on the carrier element via the slot, said member having opposite ends and opposite sides and including an upper part received in the slot and a lower part depending below the carrier element, said upper part having each of its opposite sides provided with a horizontal groove running from end to end thereof, each groove being bounded along its top edge by a laterally outwardly projecting wing integral with the upper part of the doffing member and overhanging the carrier element upper face along the associated side of the slot and each groove being bounded along its lower edge by a laterally outwardly projecting portion of the lower part of the doffing member extending beyond the associated side of the slot to abut the lower face of the carrier element; and said wings being laterally inwardly yieldable to a transverse dimension on the order of the width of the slot to enable downward removal of the doffing member from the slot.

7. A cotton picker doffer, comprising: a carrier rotatable about an upright axis and including a radial plate-like element having upper and lower faces and provided with an opening therethrough, said opening having a continuous boundary formed by contiguous portions of the carrier element so that entry thereto and exit therefrom may be had only in a generally vertical direction; and a doffing member mounted on the carrier element via the slot, said member being of plug-like form and including an intermediate portion received in the opening and upper and lower portions projecting respectively above and below the upper and lower faces of the carrier element, each of said upper and lower portions projecting laterally beyond portions of the boundary of the opening for normally preventing vertical displacement of the doffing member relative to the carrier element, and said upper portion being relatively thin in vertical dimension and composed of resilient material capable of yielding to and returning from deformation thereof to a size within the boundary of the opening to enable forcible downward ejection of the doffing member from the slot without destruction of said member.

8. The invention defined in claim 7, in which: certain of the contiguous portions of the carrier element that define the boundary of the opening are sloped downwardly and laterally to increase the area of the opening at the lower face of the carrier element and to thereby facilitate upward insertion of an identical replacement doffing member.

9. A cotton picker doffer, comprising: a carrier rotatable about an upright axis and including a radial plate-like element having upper and lower faces and provided with an opening therethrough in the form of a T having leg and bar portions normal to each other; and a doffing member mounted on the carrier element via the opening and having a lower part including portions abutting the lower face of the carrier element, an intermediate part within the leg portion of the T, and an upper part of a width on the order of the length of the bar portion of the T so as to normally overlap portions of the upper face of the carrier element along opposite sides of the leg portion of the T, at least said upper part of the doffing member being composed of resilient material capable of lateral restriction to and expansion from narrowing deformation to enable the doffing member to be forcibly displaced downwardly from the opening, the bar portion of the T affording an entry way to receive one end of the expanded upper part of an identical replacement doffing member inserted endwise into the opening from below and at an angle to the lower face of the carrier element and forced endwise along the length of the bar portion of the T.

10. The invention defined in claim 9, in which the height of the upper part of the doffing member is on the order of the width of the bar portion of the T.

References Cited in the file of this patent

UNITED STATES PATENTS

| | | |
|---|---|---|
| 2,595,601 | Paradise | May 6, 1952 |
| 2,619,784 | Paradise | Dec. 2, 1952 |
| 2,654,202 | Millard | Oct. 6, 1953 |
| 2,654,203 | Parkerton | Oct. 6, 1953 |